United States Patent
Kahn et al.

(10) Patent No.: US 7,120,581 B2
(45) Date of Patent: Oct. 10, 2006

(54) SYSTEM AND METHOD FOR IDENTIFYING AN IDENTICAL AUDIO SEGMENT USING TEXT COMPARISON

(75) Inventors: Jonathan Kahn, Crown Point, IN (US); Thomas P. Flynn, Crown Point, IN (US)

(73) Assignee: Custom Speech USA, Inc., Crown Point, IN (US)

( * ) Notice: Subject to any disclaimer, the term of this patent is extended or adjusted under 35 U.S.C. 154(b) by 780 days.

(21) Appl. No.: 10/276,382

(22) PCT Filed: May 31, 2001

(86) PCT No.: PCT/US01/17604

§ 371 (c)(1),
(2), (4) Date: Mar. 7, 2003

(87) PCT Pub. No.: WO01/93058

PCT Pub. Date: Dec. 6, 2001

(65) Prior Publication Data

US 2004/0128143 A1 Jul. 1, 2004

(51) Int. Cl.
*G10L 13/08* (2006.01)

(52) U.S. Cl. .................................................. 704/235

(58) Field of Classification Search .................... None
See application file for complete search history.

(56) References Cited

U.S. PATENT DOCUMENTS

| 5,261,040 A | 11/1993 | Suzuki |
| RE35,861 E | 7/1998 | Queen |
| 5,828,885 A | 10/1998 | Raman |
| 6,101,468 A | 8/2000 | Gould et al. |
| 6,950,753 B1 * | 9/2005 | Rzhetsky et al. ............. 702/19 |

* cited by examiner

*Primary Examiner*—Susan McFadden
(74) *Attorney, Agent, or Firm*—Sonnenschein Nath & Rosenthal LLP

(57) ABSTRACT

A method for comparing text in a first file to text in a second file. The method includes segmenting text in the first and second files to one word per line; comparing the segmented versions of the versions of the first and second files on a line by line basis; creating a result file using the segmented version of the first file; and augmenting the result file with indication of error using a sandwiching technique. This sandwiching technique includes identifying correct segments that are immediately adjacent any differences identified by comparing the segmented versions of the first and second files on a line by line basis toward sandwiching the erroneous segments between correct segments. Said method incorporates video monitor (26), keyboard (24), and mouse (23), along with microphone (25) and digital recorder (14) for implementing the invention.

11 Claims, 6 Drawing Sheets

```
The [EOL]
quick [EOL]
brown [EOL]
fex [EOL]
jumps [EOL]
oer [EOL]
the [EOL]
hog.[EOL]
The[EOL]
dish[EOL]
ran [EOL]
away [EOL]
with [EOL]
the [EOL]
spoon. [EOL]
```

Fig. 5A

```
quick [EOL]
brown [EOL]
fox [EOL]
jumps [EOL]
over [EOL]
the [EOL]
lazy [EOL]
dog.[EOL]
The[EOL]
dish[EOL]
ran [EOL]
with [EOL]
the [EOL]
spoon. [EOL]
```

Fig. 5B

```
0 The [EOL]
0 quick [EOL]
0 brown [EOL]
0 fex [EOL]
0 jumps [EOL]
0 oer [EOL]
0 the [EOL]
0 hog.[EOL]
0 The[EOL]
1 dish[EOL]
0 ran [EOL]
0 away [EOL]
0 with [EOL]
1 the [EOL]
1 spoon. [EOL]
```

Fig. 6

FIG. 7
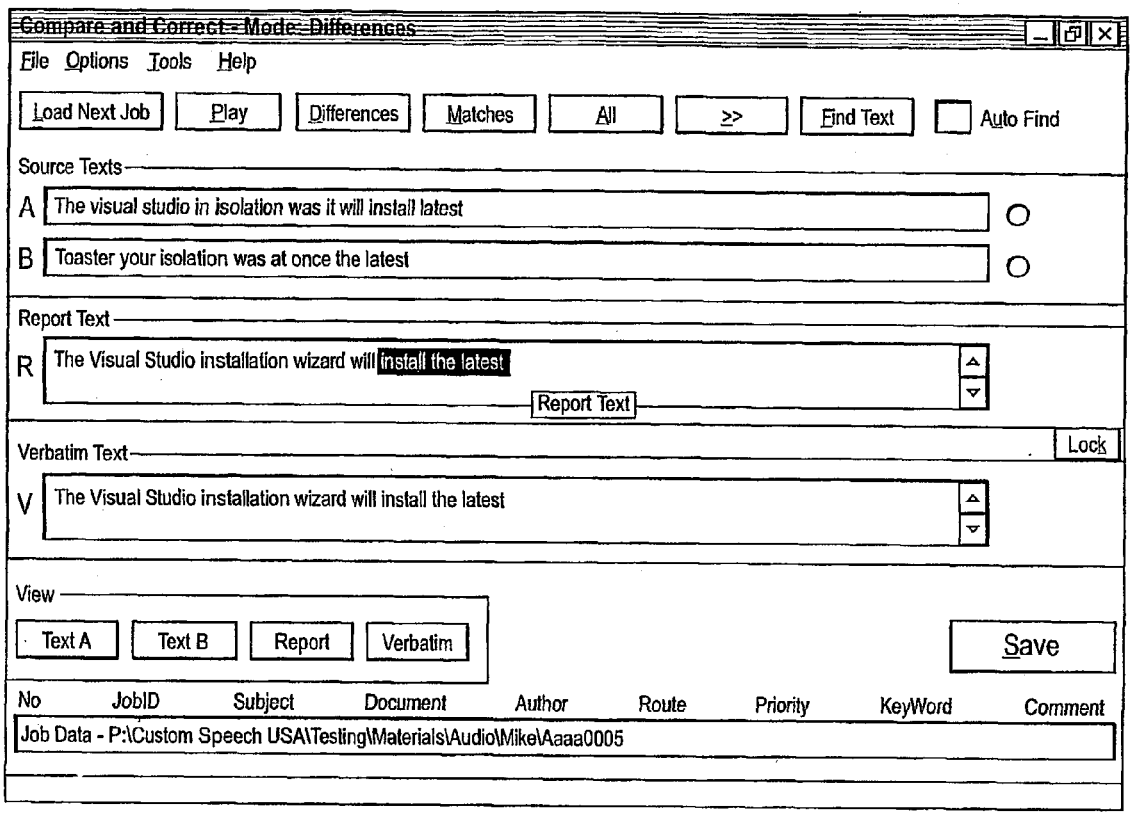
Correct the errors in each utterance then press forward to continue to the next set.
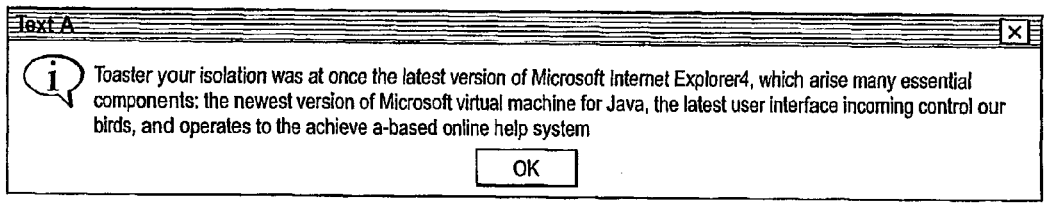
Text A window.
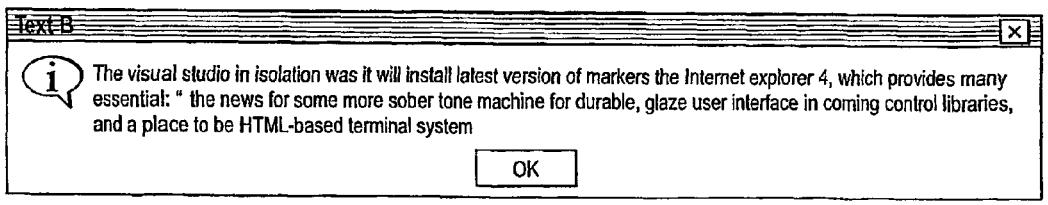
Text B window.

SYSTEM AND METHOD FOR IDENTIFYING AN IDENTICAL AUDIO SEGMENT USING TEXT COMPARISON

BACKGROUND OF THE INVENTION

1. Field of the Invention

The present invention relates in general to text comparison programs and, in particular, to a system and method for comparing text generated in association with a computer speech recognition systems.

2. Background Art

Speech recognition programs are well known in the art. While these programs are ultimately useful in automatically converting speech into text, many users are dissuaded from using these programs because they require each user to spend a significant amount of time training the system. Usually this training begins by having each user read a series of pre-selected materials for approximately 20 minutes. Then, as the user continues to use the program, as words are improperly transcribed the user is expected to stop and train the program as to the intended word thus advancing the ultimate accuracy of the acoustic model. Unfortunately, most professionals (doctors, dentists, veterinarians, lawyers) and business executive are unwilling to spend the time developing the necessary acoustic model to truly benefit from the automated transcription.

In response to this problem in the art, the assignee of the present application has previously filed a patent application directed to a system that offers expedited training of speech recognition programs. As an associated part of that system Applicant provided a simplified means for providing verbatim text files for training the aural parameters (i.e. speech files, acoustic model and/or language model) of a speech recognition portion of the system.

In this previous disclosure, Applicant utilized a common text comparison technique. While this approach generally works reasonably, in some instances the basic text comparison techniques do not work well in conjunction with text generated by a speech recognition program. For instance, speech recognition program occasionally produce text combining or altogether omitting certain spoken words. In such instances, it is extremely complicated to use standard text comparison programs to support the automated training of a speech recognition engine.

Accordingly, it is an object of the present invention to provide a text comparison program capable of handling the types of errors commonly produced by speech recognition program speech to text conversions.

These and other objects will be apparent to those of ordinary skill in the art having the present drawings, specification and claims before them.

SUMMARY OF THE DISCLOSURE

A number of technical advances are achieved in the art, by implementation of a method for comparing text in a first file to text in a second file. The method comprises: (a) segmenting text in the first file to one word per line; (b) segmenting text in the second file to one word per line; (c) comparing the segmented versions of the first and second files on a line by line basis; (d) creating a result file using the segmented version of the first file; and (e) augmenting the result file with indication of error using a sandwiching technique. The method may further include displaying the sandwiched segments.

A method for identifying the location of missing text in a text file is also disclosed. This method involves: (a) creating a first text file from a source file; (b) creating a second text file from the source file; (c) comparing the first and second text files; (d) creating a result file of sandwich segments; and (e) displaying each sandwich segment separately toward facilitating review by an end user. A further method for expediting the correction of a source file is disclosed. This method comprises: (a) creating a first text file from a source file; (b) creating a second text file from a source file; (c) comparing the first and second text files; (d) creating a result file of sandwich segments; and (e) displaying each sandwich segment separately toward facilitating review by an end user.

The sandwiching technique includes identifying correct segments that are immediately adjacent any differences identified by comparing the segmented versions of the first and second files on a line by line basis toward sandwiching the erroneous segments between correct segments. This sandwiching technique may further include merging together adjacent sandwich segments.

In a preferred approach, segmenting text further includes inserting an end of line character.

The disclosure also teaches a system for comparing text in a first file to text in a second file. The system includes means for segmenting text to one word per line; means for comparing segmented versions of the first and second files on a line by line basis; and means for sandwiching identification of differences between the first and second files with immediately adjacent correct segments.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

FIG. 5A is a sample file depicting the results of the initial formatting for a first text file resulting from speech to text conversion;

FIG. 5b is a sample file depicting the results of the initial formatting for a second text file resulting from speech to text conversion of the same audio as in 5A;

FIG. 6 of the drawings is a sample file depicting the comparison output from the comparison of the file depicted in FIG. 5A with the file depicted in FIG. 5B; and FIG. 7 of the drawings is a view of one possible graphical user interface to support the present invention.

BEST MODES OF PRACTICING THE INVENTION

Figure 1:
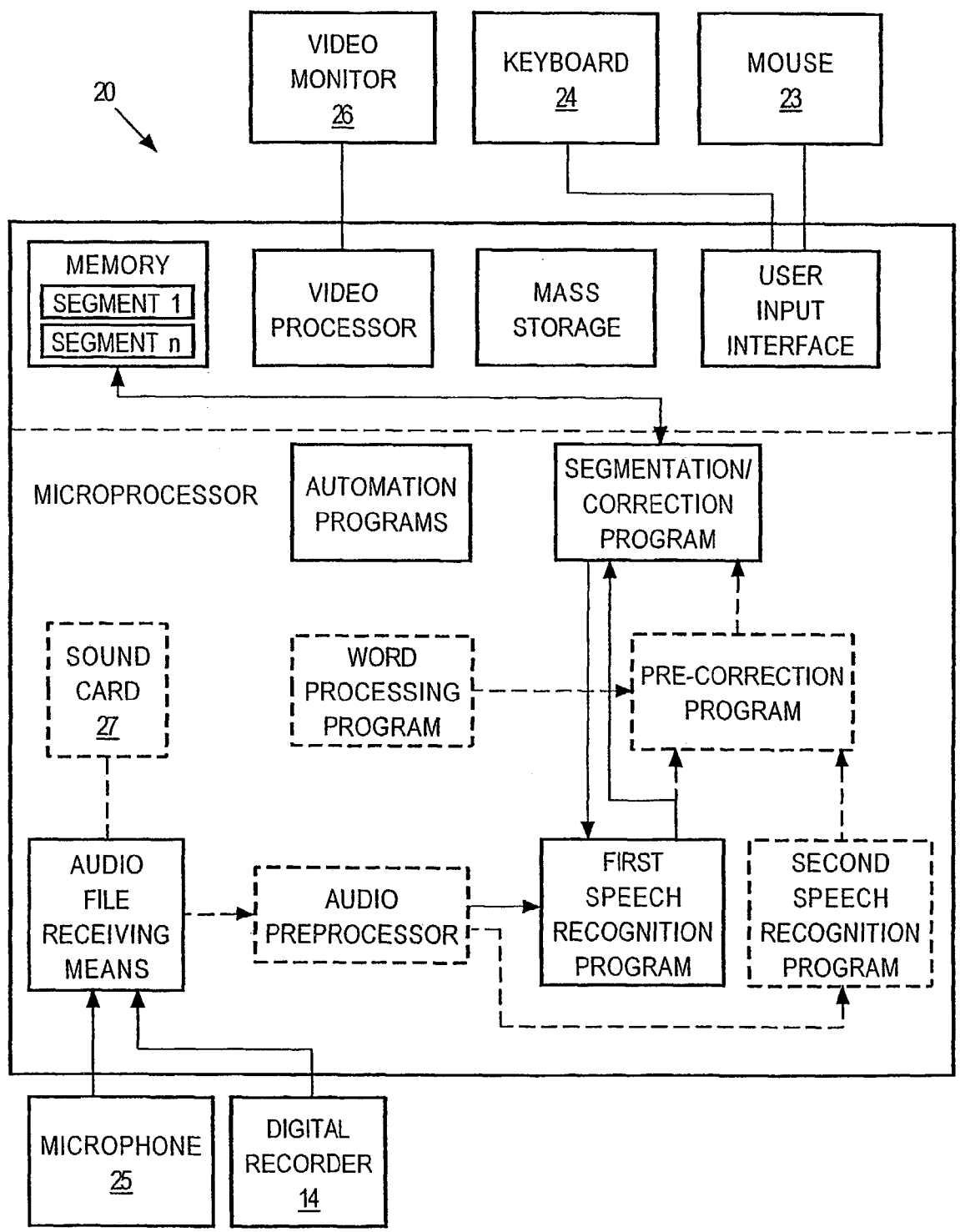
FIG. 1 of the drawings is a block diagram of a system for quickly improving the accuracy of a speech recognition program.
Figure 2:
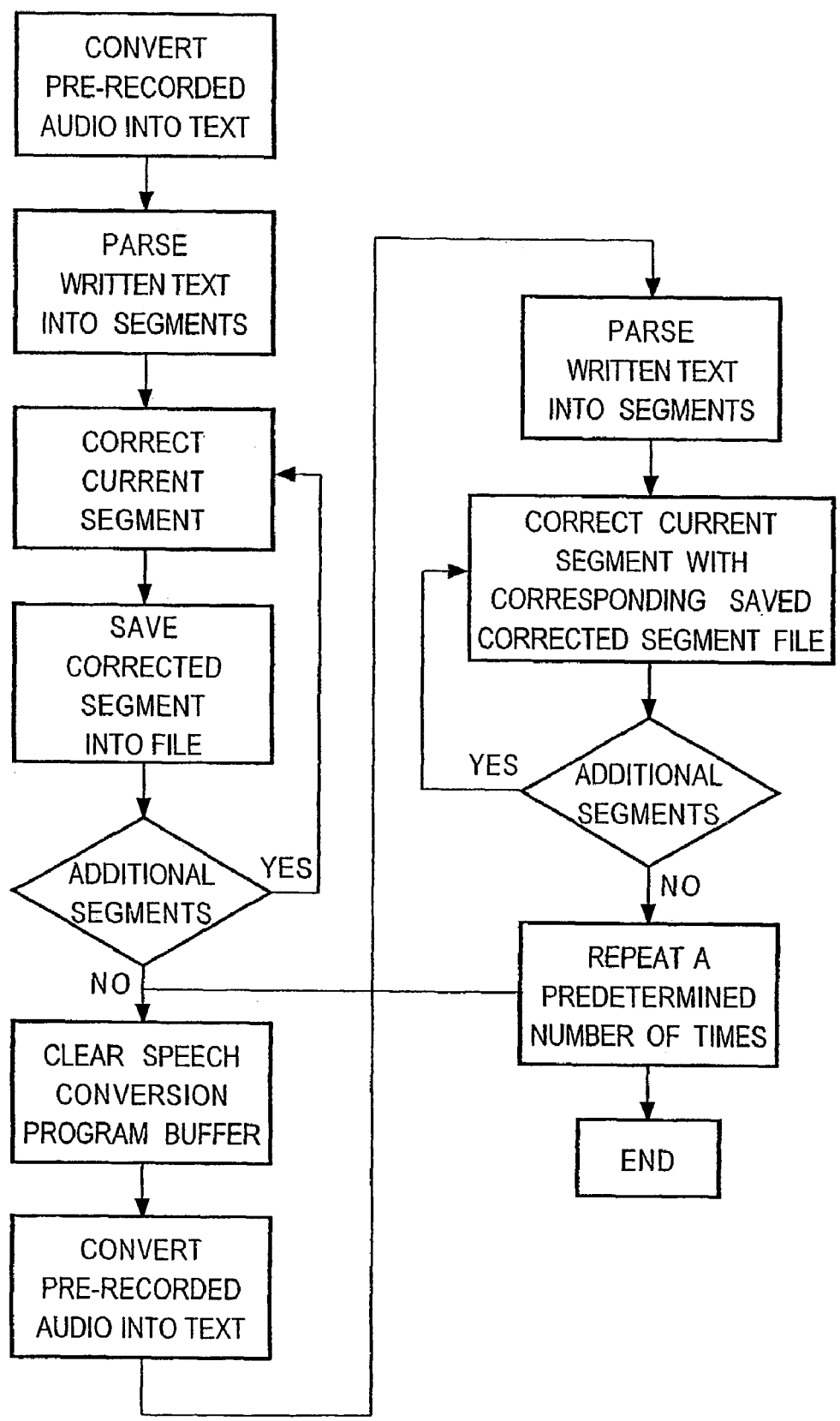
FIG. 2 of the drawings is a flow diagram of one method for quickly improving the accuracy of a speech recognition program.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

FIG. 1 of the drawings generally shows a system for quickly improving the accuracy of a speech recognition program. This system would include some means for receiving a pre-recorded audio file. This audio file receiving means can be a digital audio recorder, an analog audio recorder, or standard means for receiving computer files on magnetic media or via a data connection; preferably implemented on a general-purpose computer (such as computer 20), although a specialized computer could be developed for this specific purpose.

The general-purpose computer should have, among other elements, a microprocessor (such as the Intel Corporation PENTIUM, AMD K6 or Motorola 68000 series); volatile and non-volatile memory; one or more mass storage devices (i.e. HDD, floppy drive, and other removable media devices such as a CD-ROM drive, DITTO, ZIP or JAZ drive (from Iomega Corporation) and the like); various user input devices, such as a mouse 23, a keyboard 24, or a microphone 25; and a video display system 26. In one embodiment, the general-purpose computer is controlled by the WINDOWS 9.x operating system It is contemplated, however, that the present system would work equally well using a MACINTOSH computer or even another operating system such as a WINDOWS CE, UNIX or a JAVA based operating system, to name a few. In any embodiment, the general purpose computer has amongst its programs a speech recognition program, such as DRAGON NATURALLY SPEAKING, IBM's VIA VOICE, LERNOUT & HAUSPIE'S PROFESSIONAL EDITION or other programs.

Regardless of the particular computer platform used, where an analog audio input (such as via microphone 25) is used the general-purpose computer must include a soundcard (not shown). Of course, where a digital input is used no sound card would be necessary to input the file. However, a sound card is likely to be necessary for playback such that the human speech trainer can listen to the pre-recorded audio file toward modifying the written text into a verbatim text.

The general purpose computer may be loaded and configured to run digital audio recording software (such as the media utility in the WINDOWS 9.x operating system, VOICEDOC from The Programmers'Consortium, Inc. of Oakton, Va., COOL EDIT by Syntrillium Corporation of Phoenix, Ariz. or Dragon Naturally Speaking Professional Edition by Dragon Systems Corporation. It is also possible for the speech recognition program to create a digital audio file as a byproduct of the automated transcription process. These various software programs produce a pre-recorded audio file in the form of a "WAV" file. However, as would be known to those skilled in the art, other audio file formats, such as MP3 or DSS, could also be used to format the audio file. The method of saving such audio files is well known to those of ordinary skill in the art.

Another means for receiving a pre-recorded audio file is dedicated digital recorder 14, such as the Olympus Digital Voice Recorder D-1000 manufactured by the Olympus Corporation. Thus, if a user is more comfortable with a more conventional type of dictation device, they can use a dedicated digital recorder in combination with this system. In order to harvest the digital audio text file, upon completion of a recording, dedicated digital recorder would be operably connected toward downloading the digital audio file into that general-purpose computer. With this approach, for instance, no audio card would be required.

Another alternative for receiving the pre-recorded audio file may consist of using one form or another of removable magnetic media containing a pre-recorded audio file. With this alternative an operator would input the removable magnetic media into the general-purpose computer toward uploading the audio file into the system.

In some cases it may be necessary to pre-process the audio files to make them acceptable for processing by the speech recognition software. For instance, a DSS file format may have to be changed to a WAV file format, or the sampling rate of a digital audio file may have to be upsampled or downsampled. Software to accomplish such preprocessing is available from a variety of sources including Syntrillium Corporation and Olympus Corporation.

In some manner, an acceptably formatted pre-recorded audio file is provided to at least a first speech recognition program that produces a first written text therefrom. This first speech recognition program may also be selected from various commercially available programs, such as Naturally Speaking from Dragon Systems of Newton, Mass., Via Voice from IBM Corporation of Armonk, N.Y., or Speech Magic from Philips Corporation of Atlanta, Ga. is preferably implemented on a general-purpose computer, which may be the same general-purpose computer used to implement the pre-recorded audio file receiving means. In Dragon Systems' Naturally Speaking, for instance, there is built-in functionality that allows speech-to-text conversion of pre-recorded digital audio.

Alternatively, IBM Via Voice could be used to convert the speech to text. However, Via Voice does not have built-in functionality to allow speech-to-text conversion of pre-recorded audio, thus, requiring a sound card configured to "trick" IBM Via Voice into thinking that it is receiving audio input from a microphone or in-line when the audio is actually coming from a pre-recorded audio file. Such routing can be achieved, for instance, with a SoundBlaster Live sound card from Creative Labs of Milpitas, Calif.

The transcription errors in the first written text generated by the speech recognition program must be located to facilitate establishment of a verbatim text for use in training the speech recognition program. In one approach, a human transcriptionist establishes a transcribed file, which is automatically compared with the first written text creating a list of differences between the two texts, which is used to identify potential errors in the first written text to assist a human speech trainer in locating such potential errors to correct same.

In another approach for establishing a verbatim text, the acceptably formatted pre-recorded audio file is also provided to a second speech recognition program that produces a second written text therefrom The second speech recognition program has at least one "conversion variable" different from the first speech recognition program. Such "conversion variables" may include one or more of the following:

(1) speech recognition programs (e.g. Dragon Systems' Naturally Speaking, IBM's Via Voice or Philips Corporation's Magic Speech);

(2) language models within a particular speech recognition program (e.g. general English versus a specialized vocabulary (e.g. medical, legal));

(3) settings within a particular speech recognition program (e.g. "most accurate" versus "speed"); and/or (4) the pre-recorded audio file by pre-processing same with a digital signal processor (such as Cool Edit by Syntrillium Corporation of Phoenix, Ariz. or a programmed DSP56000 IC from Motorola, Inc.) by changing the digital word size, sampling rate, removing particular harmonic ranges and other potential modifications.

By changing one or more of the foregoing "conversion variables" it is believed that the second speech recognition program will produce a slightly different written text than the first speech recognition program and that by comparing the two resulting written texts a list of differences between the two texts to assist a human speech trainer in locating such potential errors to correct same.

Generally, the output from the Dragon Naturally Speaking program is parsed into segments which vary from 1 to, say 20 words depending upon the length of the pause setting in the Miscellaneous Tools section of Naturally Speaking. (If you make the pause setting long, more words will be part of the utterance because a long pause is required before Naturally Speaking establishes a different utterance. If it the pause setting is made short, then there are more utterances with few words.) The output from the Via Voice program is also parsed into segments which vary, apparently, based on the number of words desired per segment (e.g. 10 words per segment).

A correction program can then be used to correct the segments of text. Initially, this involves the comparison of the two texts toward establishing the difference between them. Sometimes the audio is unintelligible or unusable (e.g., dictator sneezes and speech recognition software types out a word, like "cyst"—an actual example). Sometimes the speech recognition program inserts word(s) when there is no detectable audio.

The correction program sequentially identifies each speech segment containing differences and places each of them seriatim into a correction window. A human user can choose to play the synchronized audio associated with the currently displayed speech segment using a "playback" button in the correction window and manually compare the audible text with the speech segment in the correction window. Correction is manually input with standard computer techniques (using the keyboard, mouse and/or speech recognition software and potentially lists of potential replacement words). Once the human speech trainer believes the segment is a verbatim representation of the synchronized audio, the segment is manually accepted and the next segment automatically displayed in the correction window. Once accepted, the corrected/verbatim segment from the correction window is pasted back into the first written text and ultimately saved into a "corrected" segment file. Accordingly, by the end of a document review there will be a series of separate computer files including one containing the verbatim text.

Figure 3:
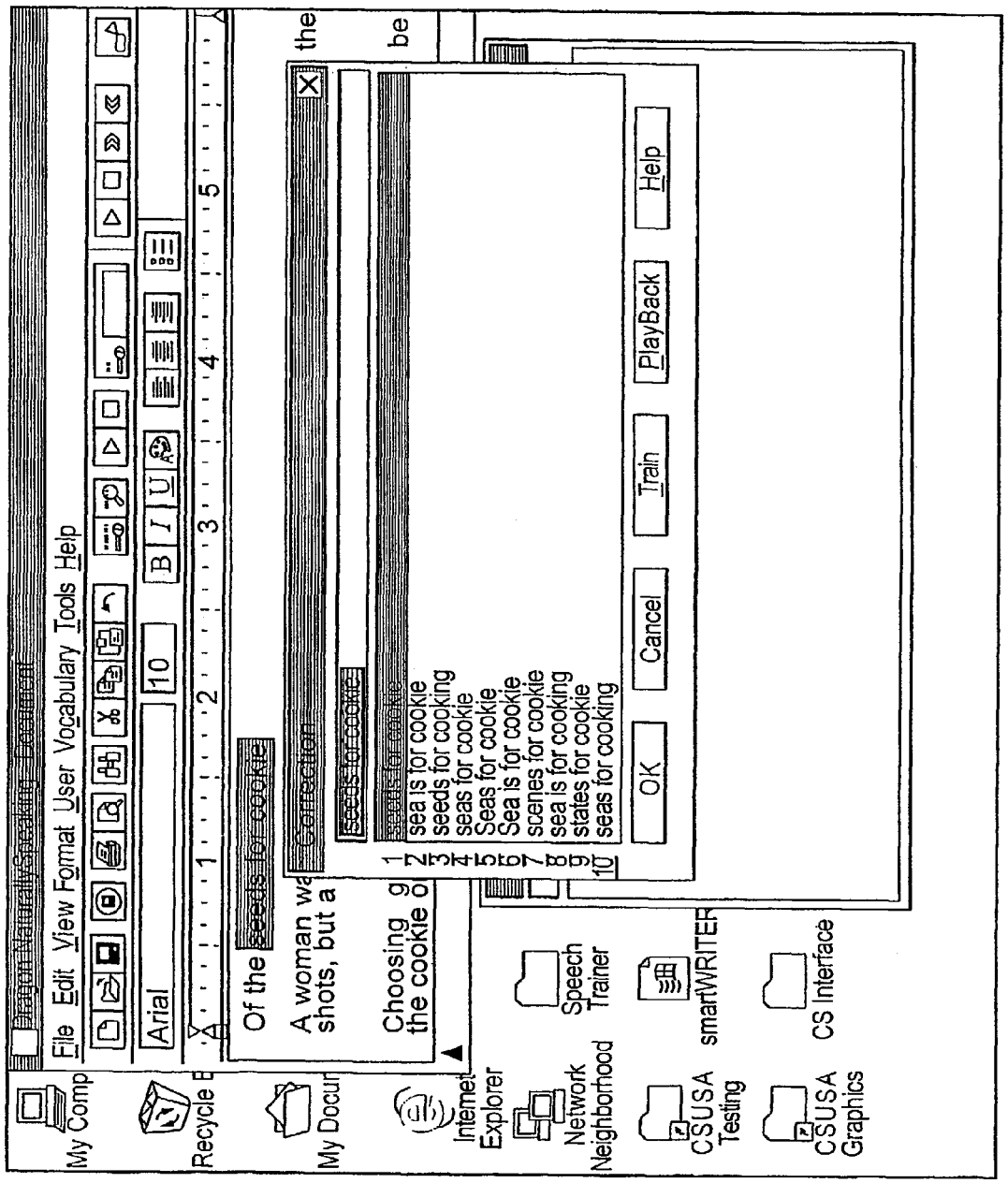
FIG. 3 of the drawings is a functional block diagram of one embodiment.

One user interface implementing the correction scheme is shown in FIG. 3. In the depicted embodiment, the Dragon Naturally Speaking program has selected "seeds for cookie" as the current speech segment (or utterance in Dragon parlance). The human speech trainer listening to the portion of pre-recorded audio file associated with the currently displayed speech segment looking at the correction window and perhaps the speech segment in context within the transcribed text determines whether or not correction is necessary. By clicking on "Play Back" the audio synchronized to the particular speech segment is automatically played back. Once the human speech trainer knows the actually dictated language for that speech segment, they either indicate that the present text is correct (by merely pressing an "OK" button) or manually replace any incorrect text with verbatim text. In either event, the corrected/verbatim text from the correction window is pasted back into the first written text and is additionally saved into the next sequentially numbered correct segment file.

Figure 4:
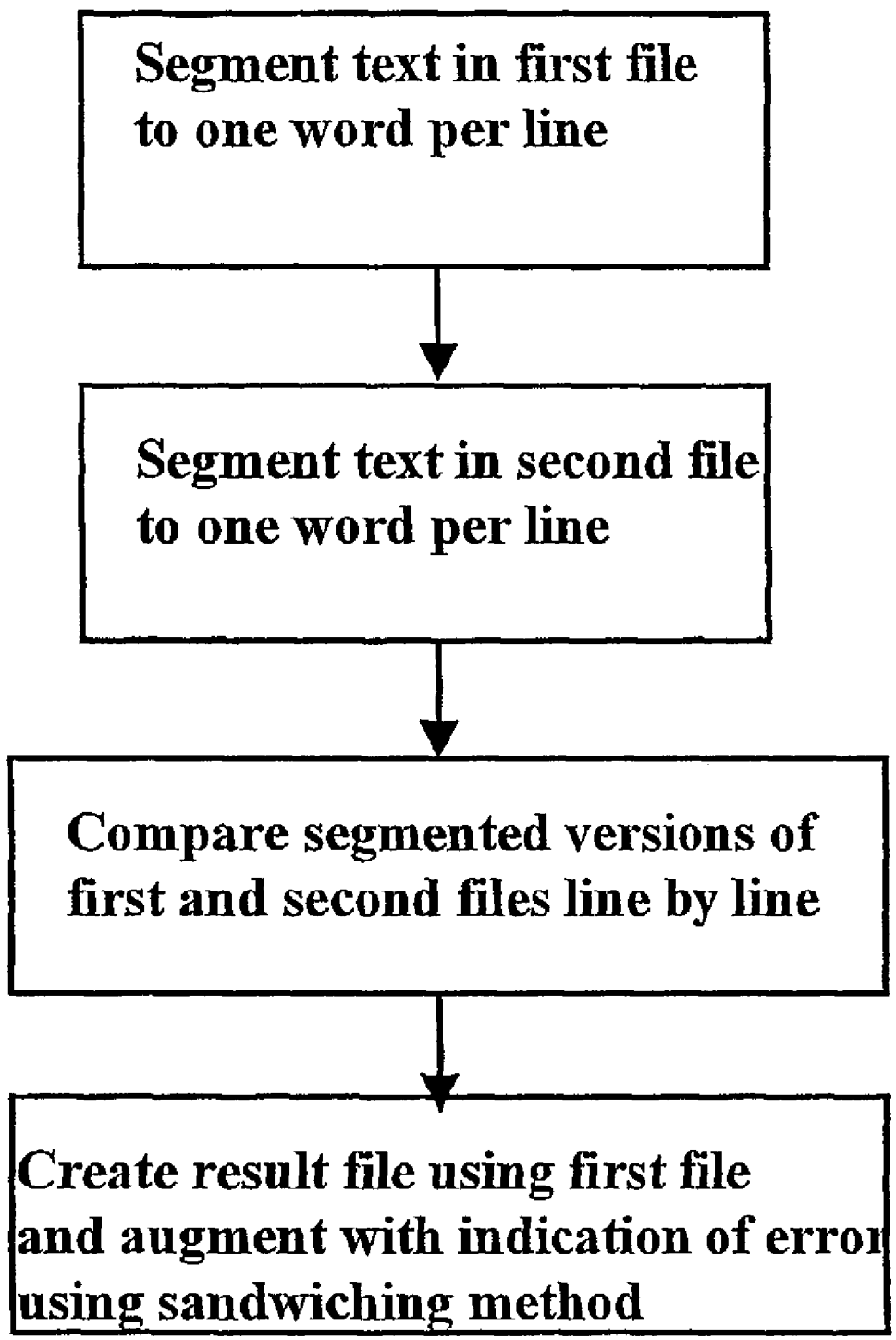
FIG. 4 of the drawings shows the present inventive method of comparing two texts.

FIG. 4 of the drawings shows the present inventive method of comparing two texts. In a preferred embodiment, each word (including any adjacent punctuation) is put on a separate line delimited by some end of line character (such as a hard or soft carriage return or tab). A sample file showing the results of this initial formatting for one text file is shown in FIG. 5A and the other file is FIG. 5B. These files are related through some mechanism—which is not significant to the present application—to a human user speaking the sentence: "The quick brown fox jumps over the lazy dog. The dish ran away with the spoon."

These two segmented files are then compared, each line using a standard text comparison program, such as File Compare (also known as FC.) or the "diff" programs available—from among other places—from Microsoft Corporation of Redmond, Wash. FC command from MS-DOS/WIN (or perhaps the "diff command") is generally preferred because the program provides line number location of errors, which makes the resulting file construction easier. FC is also more robust, can handle realignment issues and can be instructed to ignore capitalization issues. Generally, it is preferable to do the comparison using ASCII characters.

Any difference found between the two input files is identified along with any immediately adjacent "correct" segments. This identified region is referred to as a "sandwich segment." The sandwich segments may be merged together when they are adjacent (i.e. where the correct word at the end of one sandwich is the correct word at the beginning of the next sandwich. Use of these sandwich segments ensures that the each audio segment always corresponds to at least two lines of text that are created. Thus, where one of the compare files is missing a word, such as "lazy" which is missing from FIG. 5A (see FIG. 5B) the two correct segments of the sandwich are still available to be marked (i.e. "the" and "hog." (in FIG. 5A)). As would be understood, so long as there is a beginning and ending correct word to anchor each segment, it will be possible to align audio used by the speech recognition program toward ultimately synchronizing corrections with audio. Another advantage of sandwich segments is that it gives the human reviewer a larger context in which to correct the word or phrase in question.

Using the output of the comparison program and the sandwich segment concept, a file is constructed based on the first comparison file (i.e. FIG. 5A) to which a 0 ("incorrect") or 1 ("correct") is inserted before each line based on the comparison output. The file which would result from the comparison of FIGS. 5A and 5B is shown in FIG. 6. As shown in FIG. 6, the whole first sentence (i.e. "The quick brown fox jumps over the lazy dog.") forms part(s) of various sandwich segments that are now merged into one. For illustration, the unmerged segments resulting from this comparison are [The quick]; [brown fex jumps]; [jumps oer the]; [the hog.]; [the hog. The]; and [ran away with]. As noted above, the identification of the various text segments as "erroneous" is used to select text for review of a human user toward quickly establishing a verbatim text for use in training the speech recognition programs.

FIG. 7 is a depiction of one potential graphical user interface to be used with the present inventive concept.

The invention claimed is:

1. A method for comparing text in a first file to text in a second file comprising:
   segmenting text in the first file to one word per line;
   segmenting text in the second file to one word per line;
   comparing the segmented versions of the first and second files on a line by line basis;
   creating a result file using the segmented version of the first file; and
   augmenting the result file with indication of error using a sandwiching technique.

2. The method according to claim 1 wherein the sandwiching technique includes identifying correct segments that are immediately adjacent to any differences identified by comparing the segmented versions of the first and second files on a line by line basis, sandwiching the erroneous segments between correct segments.

3. The method according to claim 2 wherein the sandwiching technique further includes merging together adjacent sandwich segments.

4. The method according to claim 3 wherein the segmenting text further includes inserting an end of line character.

5. The method according to claim 1 wherein the segmenting text further includes inserting an end of line character.

6. The method according to claim 1 further including displaying the sandwiched segments for review of an end user.

7. A system for comparing text in a first file to text in a second file comprising:
   means for segmenting text to one word per line;
   means for comparing segmented versions of the first and second files on a line by line basis;
   means for sandwiching identification of differences between the first and second files with immediately adjacent correct segments.

8. The system according to claim 7 wherein the means for segmenting text further includes means for inserting an end of line character on each segmented line.

9. The system according to claim 7 further including means for displaying each sandwiched segment individually.

10. A method for identifying the location of missing text in a text file comprising:
    creating a first text file from a source file;
    creating a second text file from the source file;
    comparing the first and second text files;
    creating a result file of sandwich segments; and
    displaying each sandwich segment separately toward facilitating review by an end user.

11. A method for expediting the correction of a source file comprising:
    creating a first text file from a source file;
    creating a second text file from a source file;
    comparing the first and second text files;
    creating a result file of sandwich segments; and
    displaying each sandwich segment separately toward facilitating review by an end user.

* * * * *